United States Patent
Wood

[15] 3,699,366
[45] Oct. 17, 1972

[54] POWER TOOL WITH MOTOR SUPPORT MEANS

[72] Inventor: John W. Wood, Baltimore, Md.

[73] Assignee: The Black and Decker Manufacturing Company, Towson, Md.

[22] Filed: June 7, 1971

[21] Appl. No.: 150,852

[52] U.S. Cl. ..................................310/50, 310/91
[51] Int. Cl. ..............................................H02k 7/14
[58] Field of Search......310/50, 90, 238, 239, 47, 89, 310/91, 42, 189

[56] References Cited

UNITED STATES PATENTS

| | | | |
|---|---|---|---|
| 2,306,769 | 12/1942 | Wilhide | 310/258 X |
| 2,323,945 | 7/1943 | Strauss et al. | 310/50 X |
| 2,685,042 | 7/1954 | Klett | 310/50 |
| 3,419,957 | 1/1969 | Stone | 310/42 X |
| 3,422,294 | 1/1969 | Parker | 310/42 |
| 3,447,001 | 5/1969 | Zelik | 310/91 X |
| 3,456,696 | 7/1969 | Gregory et al. | 310/50 X |
| 3,476,960 | 11/1969 | Rees | 310/50 |
| 2,982,873 | 5/1961 | Simmons et al. | 310/258 |

FOREIGN PATENTS OR APPLICATIONS

| | | | |
|---|---|---|---|
| 833,508 | 4/1960 | Great Britain | 310/50 |

*Primary Examiner*—D. F. Duggan
*Attorney*—Leonard Bloom, Joseph R. Slotnik and Edward D. Murphy

[57] ABSTRACT

A power tool having a plastic housing containing a unitized motor assembly. The motor assembly includes a cylindrical sheet metal support which provides permanently stable location of all of the functional motor parts.

8 Claims, 6 Drawing Figures

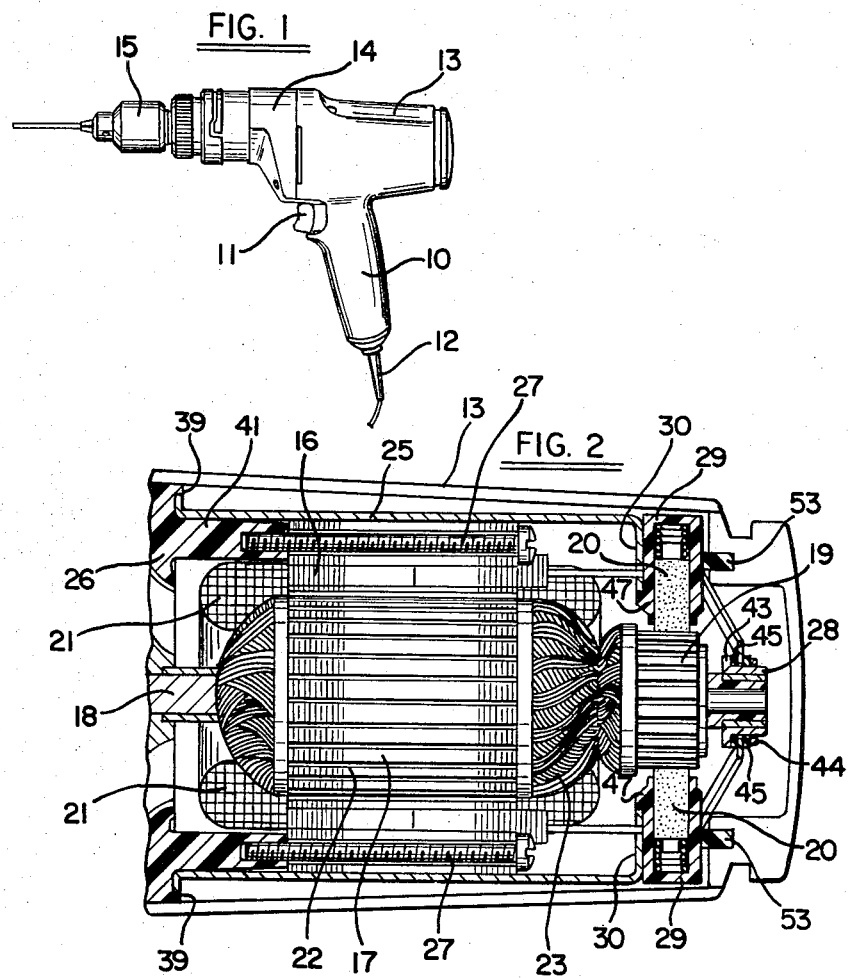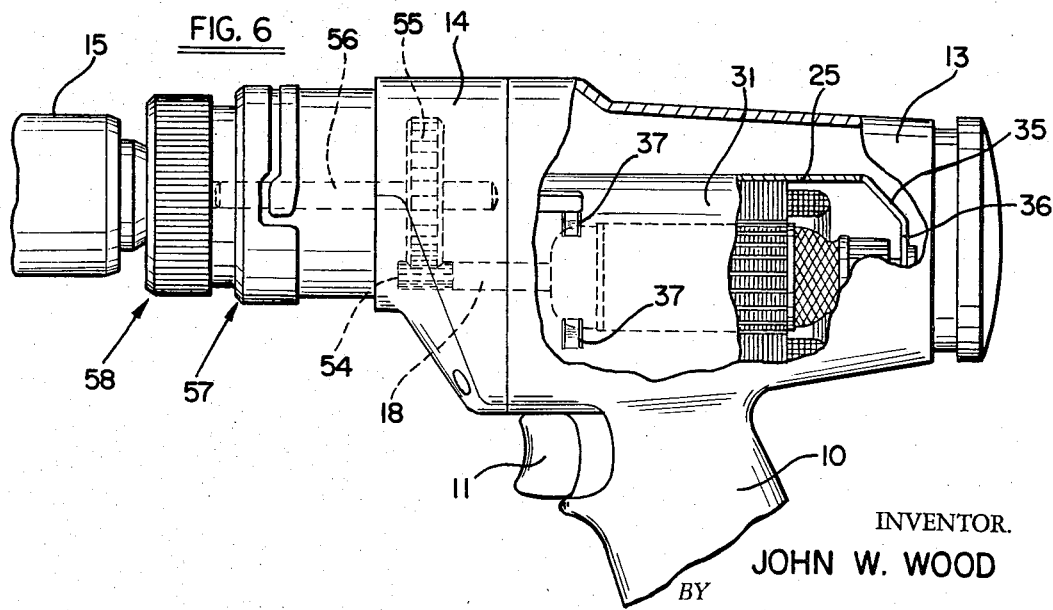
INVENTOR.
JOHN W. WOOD
BY Edward D. Murphy

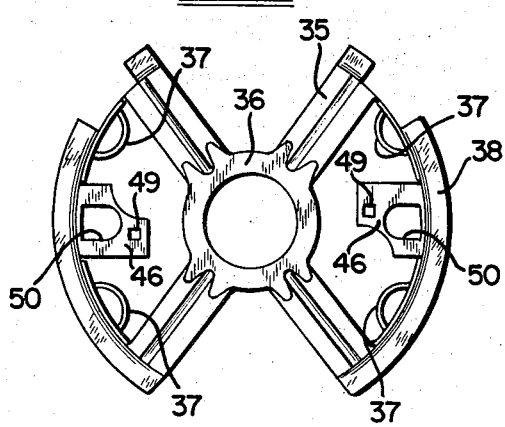
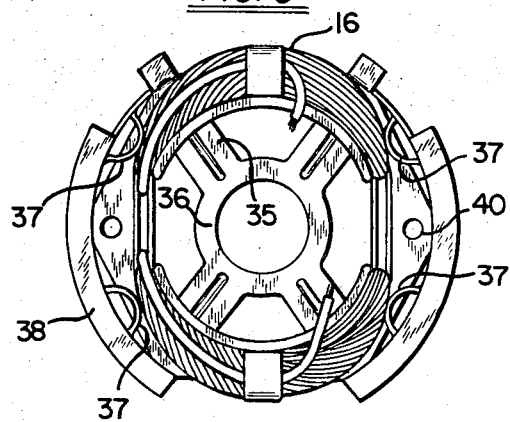
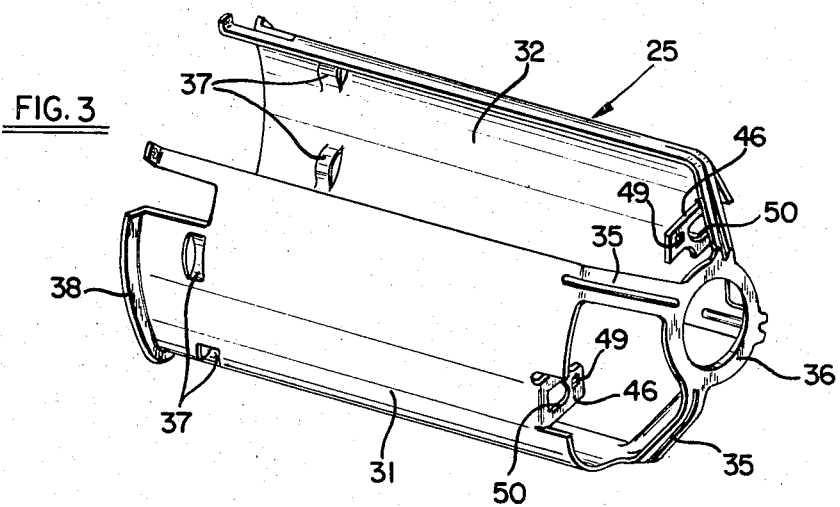

POWER TOOL WITH MOTOR SUPPORT MEANS

The present invention is directed to an improved electric power tool and specifically relates to means for supporting the electric motor within the tool.

Present power tool designs are directed to the objective of double insulation; that is, a construction in which a second layer of insulation is provided, in addition to the first layer required for functioning, between live or potentially live parts and external surfaces which can be touched by the user. In these designs, an inexpensive technique for providing the second layer of insulation is to make the tool housing of a plastic insulating material. However, inexpensive plastics, such as thermoplastics, are not sufficiently stable for use as the primary supporting structure of the various motor elements. On the other hand, thermoset plastics which are adequately stable, are expensive and thus increase the cost of the tool to the user. It is accordingly the purpose of the present invention to provide an electric motor within a power tool plastic housing in such a way that the advantages of structural rigidity and of low cost plastics can be combined.

It is accordingly an object of the present invention to provide a new and improved electric motor assembly.

Another object of this invention is the provision of a new and improved structure for defining the relative location of the functional parts of an electric motor.

A further object of this invention is the provision of a new and improved double insulation power tool construction.

It is also an object of this invention to provide a simple and low cost unitized electric motor assembly.

Further objects and advantages of this invention will become apparent as the description and illustration thereof proceed.

Briefly, in accord with one embodiment of this invention, a power tool is provided having a housing which contains a unitized motor assembly. The motor assembly comprises a generally cylindrical sheet metal enclosure which supports the essential motor elements, including the commutator end bearing, the brushholders, the field and, at one end, the armature. The forward end of the assembly is closed by a plastic spacer member which insulates the motor from the gear case or front end and which may conveniently form a baffle for the fan. The cylinder is engaged with and piloted on the plastic spacer to provide a secure, rigid mounting. Thus, the metal cylinder mounts the field, brushholders and bearing and stabilizes the relative location thereof, while permitting the use of a lower cost plastic as the housing material. At the same time, the use of a motor enclosure of this type provides for simple manufacture and easy mounting of the plastic parts therein while maintaining the desired stability of location in use. The cylinder also functions as a heat sink for the motor and assists in funnelling the flow of cooling air through the motor.

In the drawings,

FIG. 1 is a side elevation of an exemplary power tool which may utilize the construction of this invention;

FIG. 2 is a vertical cross sectional view, partially in elevation, of a motor assembly in accord with the present invention;

FIG. 3 is a perspective view of the sheet metal motor enclosure utilized in FIG. 2;

FIG. 4 is an end view of the enclosure of FIG. 3; and

FIG. 5 is an end view of the enclosure of FIG. 3 with the field of the motor in place.

In FIG. 1, a power tool is illustrated which, by way of example, includes a side handle 10 having a trigger switch 11 and cord set 12 for conducting power to an electric motor. The electric motor is located within the motor housing region 13 and, through an output shaft and a gear assembly mounted within the gear case 14, the motor applies a rotational output to a drill chuck 15. In accord with the present invention, the motor housing 13 is preferably of a low cost thermoplastic material such as polycarbonate. Use of such a material is actually an improvement due to the higher impact resistance thereof.

FIG. 2 illustrates the motor assembly provided within the housing 13. Specifically, the motor includes a field 16 and an armature 17 which cooperate in the usual manner when electric power is applied thereto to cause rotation of the armature and of the output shaft 18. Electrical power is conducted to the armature 17 via a commutator 19 and brushes 20 which are connected in an appropriate circuit with the wire coils 21 on the field 16. The illustrated armature includes the conventional stack of slotted laminations 22 in which coils of wire 23 are wound and the ends are connected to the commutator 19; the field also includes a stack of laminations and coils of wire 21.

In accord with the present invention, the motor elements are supported by a sheet metal enclosure 25 which is, in turn, mounted to an insulating spacer 26 at the forward end of the motor region. Preferably, the spacer is shaped to form a baffle for the fan. The sheet metal enclosure supports the field via bolts 27, one end of the armature via a bearing 28 and the brushholders 29 via inwardly directed tabs 30.

The details of the cylindrical, sheet metal enclosure of FIG. 2 are most clearly illustrated in FIGS. 3, 4 and 5 wherein it can be seen that the motor enclosure member 25 comprises a one piece sheet metal cup. In this case, the cup is divided into two segments 31 and 32, although a fully cylindrical cup member could also be used satisfactorily. In the illustrated embodiment, the members 31 and 32 include a supporting web, also illustrated in the end view of FIG. 4, which comprises a plurality of radially extending leg portions 35 and a central bearing support member 36.

As illustrated in FIG. 5, the field 16 is fitted within the cylindrical enclosure by expanding the leg portions 31 and 32 and releasing them after the field is inserted so that the detents 37 engage the forward edge of the field. Alternatively, the field could be retained by spot welding or other means. The leading edge of the enclosure 25 is turned outwardly to form a radial flange 38. As can be seen in FIG. 2, this flange is mounted against the insulative baffle 26 and the outward shoulder on the flange pilots against a step 39 formed in the baffle. At two locations, the field is provided with apertures 40 and the baffle is provided with extended pedestals 41. Thus, after insertion of the field, the baffle is mounted at the end of the sheet metal enclosure and the bolts 27 are used to complete the assembly of the field, the enclosure and the baffle.

In further accord with this invention, a sleeve bearing 28 is mounted within the bearing support portion 36 of the sheet metal enclosure. For example, this may be done by providing a flange 43 on one end of the bearing and affixing it in place with a washer 44 of the type which includes fingers extending radially inward to grip the bearing. A degree of self-alignment may be provided by mounting rubber washers 45 on each side of the bearing support 36.

The brushholders 29 are mounted on the inwardly bent tabs 46, shown in FIGS. 3 and 4. Preferably, the brushholder is locked to the tab by having shoulders such as 47 which engage the outer periphery of the tab; the brushholder may also include a square plug 48 which extends through the opening 49 in the metal tab. The opening 50 in the tab is provided to enable a screwdriver to be used to reach the bolt 42 during assembly of the field. The brushholders are held in place in the final assembly by means of a brush cap 52 and a pair of rubber plugs 53.

The structural motor support member 25, in accord with the present invention, simultaneously provides a number of necessary functions which have formerly been provided by various independent members. Primarily, the cylinder serves as an inexpensive but highly rigid and stable locating means for the field and armature, eliminating any necessity that this function be performed by the exterior housing. In addition, this construction pilots against the fan baffle, thus stabilizing the relative location of the motor to the front end of the unit and it provides a fixed and stable location for the brushholders. In addition to the stability achieved by virtue of the fact that this member is metal rather than plastic, it is also significant that these functions are performed by a single part, thus eliminating the inaccuracies which may arise due to the tolerance build up which necessarily occurs when several different parts are combined to perform these functions. It is also noted that the use of a metallic supporting structure for the motor provides an additional heat sink for removing heat from the motor and transferring it into the stream of cooling air, and it constrains cooling air to flow around hot motor parts.

FIG. 6 illustrates schematically the overall construction of the tool shown in FIG. 1. Specifically, the motor support 25 is enclosed within the motor housing 13 and is coupled through shaft 18 to a gear train illustrated as comprising a pinion 54 and spur gear 55 which in turn drives the output shaft 56. The power unit including the motor and gear set is intended for use as the driver for a variety of attachment heads, each of which enables the tool to perform one or more specific output functions. To this end, an attachment coupling system indicated generally at 57 and more completely described in my copending application, Ser. No. 7138 which is assigned to the assignee of this application, is provided on the forward end of the output shaft 56. As an illustrative attachment, a drill: hammer-drill mechanism is indicated generally at 58. The mechanism of this attachment is described more completely and claimed in my copending application, Ser. No. 7139 which is also assigned to the assignee of this application.

While the foregoing has been directed to a specific embodiment of the present invention, it will be clear to those skilled in the art that many changes and modifications can be made from the illustrated construction. Accordingly, it is intended that the appended claims cover all such changes and modifications as may fall within the true spirit and scope of this invention.

I claim:

1. In a portable electric power tool including a housing, a device extending from said housing for producing an output, and an electric motor mounted in said housing for driving said device, said motor including an annular field structure, the combination therewith of a one-piece, generally cylindrical support for said field; said support having means for mounting a bearing at one end thereof; flange means on the other end of said support for accurately mounting said support in said tool; a mounting member having a pilot surface in said tool for receiving said flange; threaded means extending through said field and coupled to said mounting member for retaining said field in said tool; and means on said support adjacent said other end engaged by said field whereby tightening of said threaded means draws said flange means against said pilot surface.

2. A power tool as claimed in claim 1 wherein said support further comprises a web portion extending from said bearing support portion to a generally cylindrical portion.

3. A power tool as claimed in claim 1 wherein said tool further comprises an insulative housing, said motor support being located within said housing.

4. A power tool as claimed in claim 3 wherein said support cooperates with said housing to limit air flow to a path through said motor.

5. A power tool as claimed in claim 1 wherein said means engaged by said field comprises a plurality of indented portions formed in said cylindrical support.

6. In a portable electric power tool including an insulative housing, a device extending from said housing for producing an output, and an electric motor mounted in said housing for driving said device; the combination therewith of a one-piece, generally cylindrical support for said motor; said support having means for mounting a bearing at one end thereof; an insulated armature shaft received in said bearing; said support further comprising mounting means for receiving a plurality of brush-holders thereon; flange means on the other end of said support for accurately mounting said support in said tool; an insulative baffle having a pilot surface for receiving said flange; and means for retaining said support tightly against said surface.

7. In a portable electric power tool including an insulative housing, a device for producing an output, and an electric motor in said housing for driving said device, the combination therewith of an improved motor retaining structure comprising a generally cylindrical sheet metal support in said housing and including means for retaining a stationary motor field within said support; means for retaining a bearing at one end of said support; the other end of said support being adapted for mounting to a piloting surface; and a pair of radially directed tang portions integral with said support, each of said tang portions including means for supporting insulating brushholders thereon.

8. In a portable electric power tool including a device for producing an output and an electric motor for driving said device, the combination therewith of an improved motor retaining structure comprising a generally cylindrical sheet metal support including means for retaining a stationary motor field within said support; means for retaining a bearing at one end of said support; the other end of said support being adapted for mounting to a piloting surface; means integral with said support for supporting insulating brushholders thereon; and means extending coaxially with said support for drawing said support tightly against said piloting surface to align said motor within said housing.

* * * * *